Patented Feb. 19, 1946

2,395,117

UNITED STATES PATENT OFFICE 2,395,117

DYESTUFFS OF THE PHTHALOCYANINE SERIES AND PROCESS OF PREPARING THE SAME

Norman Hulton Haddock, Blackley, Manchester, England, assignor to Imperial Chemical Industries Limited, a corporation of Great Britain No Drawing. Application April 12, 1943, Serial No. 482,822. In Great Britain May 13, 1940

6 Claims. (Cl. 260—314.5)

This application is a continuation-in-part of my copending application Serial No. 390,912, filed April 29, 1941 (U. S. Patent No. 2,342,662, issued February 29, 1944).

This invention relates to novel textile dyes, pigments and intermediates of the phthalocyanine series. More particularly, this invention relates to sulfur-containing compounds of the phthalocyanine series, of the general formula Q—$(SCN)_x$, wherein Q stands for the radical of a phthalocyanine compound selected from the group consisting of metal-free phthalocyanines and metallic phthalocyanines of the benzene and naphthalene series, their homologs and substitution derivatives, e. g., halogen, nitro, phenyl, phenoxy, benzoyl, etc.; SCN designates the thiocyanate radical, while $x$ is a numeral from 1 to 4.

Compounds of the phthalocyanine series find at present their greatest commercial use as valuable pigments for printing inks, paints and other pigmented coating compositions. It is known that the introduction of certain substituents, such as for instance sulfonic acid groups into the phthalocyanine molecule, renders the products soluble in water and produces direct dyes which can be used for textile and paper dyeing. However, such known water-soluble phthalocyanines are deficient in exhausting properties, and the wash fastness and other fastness properties of the dyeings on cotton are not entirely satisfactory.

It is known that many aromatic intermediates of the benzene and naphthalene series and some heterocyclic compounds can be fused with sulfur and alkali polysulfides to give vattable dyes, generally referred to as sulfur colors, which contain sulfur atoms in the molecule, and which can be dissolved in diluted alkaline sodium sulfide or hydrosulfite to give what appears to be a solution of the alkali salt of a mercapto compound. From this solution (or "vat") textiles are dyed in various shades. When these dyeings are exposed to the air or other oxidizing agents, the water-soluble alkali salts are converted on the fiber into the original insoluble dye. While these known sulfur dyes are comparatively inexpensive, and are therefore used to a great extent for the dyeing of cotton and other fabric, they show, in general, quite inferior fastness properties and dull shades, and they cannot be used for commercial textile printing by conventional vat dye methods, since the presence of free sulfur or sulfides in the printing paste renders the same unsatisfactory to be printed from engraved copper cylinders which are stained by such sulfur compounds.

This invention has as its object to prepare new sulfur-containing phthalocyanine derivatives which can be applied to textiles in much the same way as commercial sulfur colors, but which possess much superior fastness properties and very desirable bright bluish-green to greenish-blue shades, such as have not been obtained heretofore from any known commercial sulfur dye. A further object of this invention is to utilize the well-known and outstanding tinctorial strength and clarity of the pigment shade, shown by compounds of the phthalocyanine series, for the dyeing and printing of cotton, wool and other common fabric. Other and further important objects of this invention will appear as the description proceeds.

These objects are accomplished by the following invention. I have discovered that thiocyanates of the phthalocyanines can be obtained readily from the corresponding amino-phthalocyanines by known methods, for instance, by converting the amino compounds into diazo derivatives, and converting the latter in turn into thiocyanates simply by treatment with an alkali-metal thiocyanate. This effect is very surprising, because in the case of simpler aryl diazo compounds, for instance phenyl or naphthyl diazo compounds, it has been the experience of the art that they do not react with alkali thiocyanates sufficiently to give acceptably high yields and pure enough reaction products.

Furthermore, I have discovered that the thiocyano derivatives of the phthalocyanines thus obtained are suitable directly for dyeing cellulosic fiber by the standard sulfur-dyeing process, that is, by dissolving the compounds in an alkaline sodium sulfide vat, impregnating the fiber therewith and then oxidizing the dyeing on the fiber by exposure to air or by treatment with dilute sodium chromate and acid. This effect is again highly surprising, because theory demands that such dyeing must proceed as a result of hydrolysis of the thiocyano compound in the vat to the corresponding mercaptans and oxidation of the latter on the fiber to a disulfide or poly-disulfide compound; such easy hydrolysis, however, was not to be anticipated, because in the case of the simpler aryl compounds it has been our experience that their thiocyanates do not hydrolyze readily except under drastic conditions, involving for instance refluxing for six hours with very strong aqueous or alcoholic caustic soda. It is very surprising, therefore, that the relatively cool (82–93° C.) and weakly alkaline (sodium carbonate) aqueous sodium-sulfide vat is capable of hydrolyzing phthalocyanine thiocyanates so readily as to produce a satisfactory dyeing on the fiber.

The amino-phthalocyanines, which serve as the preferred starting materials for the products of this invention, are obtainable by the methods described in British Patent No. 529,847 (U. S. Patent No. 2,280,072). They are preferably made by subjecting 4-nitro-phthalimide, or mixtures of 4-nitro-phthalimide together with unsubstituted phthalimide in molecular proportions (in ratios of 1:3, 2:2, or 3:1), to the usual fusion with metal salts in the presence of urea and ammonium molybdate, followed by reduction of the resulting nitro compounds with sodium hydrogen sulfide. They may also be obtained from the corresponding nitro-phthalonitrile or from mixtures of nitro-phthalonitrile with unsubstituted phthalonitrile, according to known methods. Among the aminophthalocyanines which are particularly suitable as starting materials for this invention may be mentioned:

Copper-tetra-(4)-aminophthalocyanine,
Copper-tri-(4)-aminophthalocyanine,
Copper-di-(4)-aminophthalocyanine,
Copper-mono-(4)-aminophthalocyanine,
Cobalt-tetra-(4)-aminophthalocyanine,
Nickel-tetra-(4)-aminophthalocyanine,
Metal-free-tetra-(4)-aminophthalocyanine.

The conversion of the diazo compounds, obtained from the above aminophthalocyanines, into the above-mentioned thiocyano derivatives may be carried out by treating the polydiazonium phthalocyanine with an alkali metal thiocyanate. Evolution of nitrogen proceeds spontaneously, and no prolonged heating at high temperature is needed.

The resulting thiocyanates of phthalocyanines may be applied as dyestuffs to cellulosic material from sodium sulfide solution according to the usual practice with sulfur dyestuffs. By this procedure the thiocyanophthalocyanines become hydrolyzed in the sodium sulfide solution to mercapto-phthalocyanines. Thus, by the dyeing technique usual with sulfur dyestuffs, there are produced on the fiber, the same sulfur dyestuffs, to the production of which in substance my parent application above referred to is dedicated. In this way, as in the parent case, there are produced on the fiber, bluish-green to greenish-blue dyeings which show outstanding fastness to washing and light and are, in general, equal in fastness properties and clarity of shade to the anthraquinone vat dyes. The dyeings are dischargeable to good whites by steaming after-treatment with dimethyl-(sulfobenzyl)-phenyl-ammonium chloride, sodium hydroxide and sodium formaldehyde sulfoxylate solutions. The new sulfur-containing dyes may also be used for printing on textiles by conventional printing methods which are used for the printing of anthraquinone and indigoid vat dyes, preferably by the glucose-caustic soda method.

Inasmuch as my parent application achieves the same result, by applying to the fabric phthalocyanine-poly-disulfide compounds obtained from phthalocyanine mercaptans, my present invention may be looked upon as offering a process for producing phthalocyanine-sulfur dyes on the fiber, that is, on the cellulosic material, directly by application thereto of the intermediate products in the manufacturing process, which are thiocyanophthalocyanines.

On the other hand, the above-named novel compounds may be used, if desired, for producing phthalocyanine-poly-disulfide dyes in substance, for instance by treating the above compounds with sodium sulfide in aqueous alcoholic suspension, and then aerating the mixture to convert the intermediate polymercapto compound into a polydisulfide. Alternatively, the same result may be achieved by hydrolyzing the thiocyanate, for instance, with sodium hydroxide, followed by oxidation to convert the mercapto groups into polydisulfide chains.

The invention is further illustrated, but not intended to be limited, by the following examples, in which the parts are by weight.

*Example 1*

20 parts of copper tetra-(4)-aminophthalocyanine in the form of a finely-milled 5% aqueous paste are added to 240 parts of 36% hydrochloric acid with good agitation. The mixture is stirred at 5° C. and a solution of 13 parts of sodium nitrite in 250 parts of water is added quickly, the temperature of the mixture being allowed to rise to 10° C. To the clear diazo solution at 10° C. is added a solution of 40 parts of sodium thiocyanate dissolved in the minimum quantity of water. There is an immediate evolution of nitrogen and a green precipitate is formed. The mixture is stirred at room temperature for one-half hour and the reaction is completed by warming the mass for 5 minutes at 45° C. The green precipitate of copper-tetra-(4)-thiocyanophthalocyanine is filtered off, washed with water and finally with alcohol. This may now be dried and then standardized by the addition of inert solid diluents, for instance common salt or dextrine, to match any desirable or established standard in dyeing strength.

Alternatively, the filter cake after washing with water as above may be diluted with sufficient water to give a paste of approximately 25% color solids which may then be milled, after the addition of a small amount of the condensation product of sulfonated naphthalene with formaldehyde, to give a smooth color paste. This paste is stable on storage, free of objectionable odor, and may be marketed and used for commercial dyeing and printing applications in the same manner as is customary for standard color pastes of sulfur dyes or for printing pastes made from vat dyes of the thioindigoid or anthraquinone color classes.

The method of dyeing with the powder or pastes obtained as above is illustrated in the following example:

*Example 2*

1 part of copper-tetra-(4)-thiocyanophthalocyanine (obtained as described above), 1.5 parts of sodium sulphide crystals, 1 part of anhydrous sodium carbonate and 20 parts of water are heated together at 82 to 93° C. until a clear solution is obtained. The copper-tetra-(4)-thiocyanophthalocyanine thereby becomes hydrolyzed to copper-tetra-(4)-mercapto-phthalocyanine. The solution is diluted with 3000 parts of warm water and 100 parts of bleached cotton yarn, previously well wetted-out by soaking in cold water, are immersed therein. The solution is heated to 85° C. 15 parts of sodium chloride are added. The temperature is maintained at 85° C. and at the end of one-half hour a further addition of 15 parts of sodium chloride is made, the cotton being occasionally turned. After a further one-quarter hour the cotton yarn is removed, squeezed, rinsed in cold water and allowed to hang in the air. The copper-tetra-(4)-mercapto-phthalocyanine on the yarn becomes oxidized (probably forming a polydisulphide) and the cotton yarn acquires a bright green shade.

In lieu of aerating, the dyeing on the fiber may be oxidized by treatment at 50 to 60° C. with a dilute solution of sodium perborate (neutral bath) or with a dilute acetic acid solution of sodium bichromate. As a practical example of the latter option, an oxidation bath for 100 parts of cotton yarn may be prepared by using two parts of sodium bichromate ($Na_2Cr_2O_7 + 2H_2O$) and four parts of acetic acid, diluted with water to a total of 2000 parts. After oxidation, the cotton may be soaped, rinsed and dried in the usual manner.

If desired, the tetra-thiocyano-copper-phthalocyanine above obtained may be converted into a polydisulfide dye in substance. This is illustrated in the following example:

*Example 3*

The filter cake from Example 1, after washing successively with water and alcohol as therein described, is suspended in a mixture of 500 parts of alcohol and 170 parts of 20% aqueous sodium sulphide solution. The mixture is boiled and stirred until all the suspended matter has dissolved and a grey-blue solution of the sodium mercaptide has been obtained. A stream of air is now passed through to oxidize the sodium mercaptide. The product, probably a polydisulfide, forms a green suspension. It is filtered off, washed with water and dried.

The product is a green powder which is insoluble in dilute alkalis. It is also insoluble in water but is soluble in hot dilute aqueous sodium sulphide to give a dark blue solution. From this solution cotton may be dyed in dull blue shades which on exposure to the air yield bright green dyeings of outstanding fastness to washing, soap boiling, chemick and light.

*Example 4*

20 parts of nickel-tetra-(4)-aminophthalocyanine in the form of finely-milled 2.2% aqueous paste are added to 300 cc. of 36% hydrochloric acid with good stirring. 60 parts of 10% aqueous sodium nitrite solution are added to below 10° C. As soon as a clear solution of the tetradiazo compound has been obtained, 20 parts of ammonium thiocyanate dissolved in a little water are quickly added. The mixture is stirred for one-half hour at 15° C. and then warmed to 90° C. for a further one-half hour to complete the reaction. The green suspension of nickel-tetra-(4)-thiocyanophthalocyanine is filtered and may be applied directly to the fiber by the sulfur-dyeing process, or converted in substance to the polydisulfide, in the manner described for the copper derivative in Examples 2 and 3.

The polydisulfide product is a green powder soluble in warm dilute aqueous sodium sulphide solution to give a dark green solution from which cotton is dyed in green shades of excellent fastness to washing, soap boiling and light. The shades are yellower than those obtained from the corresponding copper derivative of Example 3.

*Example 5*

300 parts of a 5% aqueous paste of copper-tri-(4)-aminophthalocyanine are added with vigorous stirring to 300 parts of 36% hydrochloric acid. The bright blue suspension of the hydrochloride thus obtained is cooled to 0–5° C. and 75 parts of 10% aqueous sodium nitrite solution are added rapidly. A clear, bright green solution of the tridiazo compound is immediately formed. After stirring for one minute, a solution of 25 parts of sodium thiocyanate in 100 parts of water is added quickly. The resulting green suspension is warmed to 90° C. during about one hour, and maintained at 90–95° C. for one-quarter hour. The product is filtered off and washed with water until acid-free, and then with alcohol. The copper - tri - (4) - thiocyanophthalocyanine, so - obtained, may be applied directly to the fiber or may be converted to the polydisulfide in substance, in the manner described in Examples 2 and 3.

The resulting dyeing on cotton is a sulfur-containing dyestuff of bright green shade and excellent fastness to washing, chemick, soap-boiling and light.

In an analogous manner, diamino and monoamino copper-phthalocyanines, obtained for instance as in Examples II and III or XI of my parent application, Serial No. 390,912, may be converted into the corresponding dithiocyano and monothiocyano derivatives of copper-phthalocyanine, which in turn may be used directly as sulfur dyes for cotton or may be converted in substance to the corresponding disulfide derivatives by the methods illustrated in Examples 2 and 3 above.

It will be understood by those skilled in the art that many variations and equivalents may be used in the above-illustrated processes without departing from the spirit of this invention. Thus, the diazotization of the amino derivatives may be accomplished by using sulfuric acid in place of hydrochloric acid. The acid concentration used for the diazotization may be varied within wide limits, but best results are obtained with comparatively strong acid (10%) concentration.

In the claims below, the expression "disulfide" or "disulfide group" when used in conjunction with a phthalocyanine compound, is to be understood as referring to the group —S—S— the free linkages of which are attached to carbon atoms of the same phthalocyanine molecule or two different phthalocyanine molecules.

I claim:

1. A compound of the phthalocyanine series characterized by the presence of at least one thiocyano group (SCN) as a substituent for hydrogen in its arylene nuclei.
2. Tetrathiocyano-nickel-phthalocyanine.
3. Tetrathiocyano-copper-phthalocyanine.
4. Trithiocyano-copper-phthalocyanine.
5. The process of producing a thiocyano derivative of a compound of the phthalocyanine series, which comprises reacting the diazotized form of a corresponding amino-derivative of the said compound with an alkali-metal thiocyanate.
6. The process of producing copper-tetrathiocyanophthalocyanine, which comprises diazotizing copper-tetraamino-phthalocyanine to produce the corresponding tetra-diazo compound, and reacting upon the latter with an aqueous solution of sodium thiocyanate.

NORMAN HULTON HADDOCK.